United States Patent
Ramadass et al.

(10) Patent No.: US 10,826,403 B1
(45) Date of Patent: Nov. 3, 2020

(54) ACTIVE Y-RATED CAPACITOR CONTROL OPTIONS FOR COMMON-MODE ELECTROMAGNETIC INTERFERENCE (EMI) REDUCTION

(71) Applicant: TEXAS INSTRUMENTS INCORPORATED, Dallas, TX (US)

(72) Inventors: Yogesh Kumar Ramadass, San Jose, CA (US); Ashish Kumar, Santa Clara, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/566,240

(22) Filed: Sep. 10, 2019

(51) Int. Cl.
*H02M 3/335* (2006.01)
*H02M 1/088* (2006.01)
*H02M 1/00* (2006.01)

(52) U.S. Cl.
CPC ....... *H02M 3/33569* (2013.01); *H02M 1/088* (2013.01); *H02M 2001/0048* (2013.01)

(58) Field of Classification Search
None
See application file for complete search history.

(56) References Cited

U.S. PATENT DOCUMENTS

| 7,710,746 | B2 * | 5/2010 | Park | H02M 3/33515 363/21.18 |
| 9,172,309 | B2 * | 10/2015 | Jeong | H02M 7/04 |
| 2012/0153858 | A1 * | 6/2012 | Melanson | H02M 3/33523 315/279 |
| 2014/0268917 | A1 * | 9/2014 | Ma | H02M 3/33523 363/21.15 |
| 2015/0230300 | A1 * | 8/2015 | Knoedgen | H02M 3/33507 315/219 |
| 2017/0302165 | A1 * | 10/2017 | Marcinkiewicz | H02M 1/4208 |

* cited by examiner

*Primary Examiner* — Lincoln D Donovan
*Assistant Examiner* — Khareem E Almo
(74) *Attorney, Agent, or Firm* — Lawrence J. Bassuk; Charles A. Brill; Frank D. Cimino

(57) ABSTRACT

A system includes an input voltage supply and a switching converter coupled to the input voltage supply. The switching converter includes a transformer having a primary coil and a secondary coil. The switching converter also includes a Y-rated capacitor with a top plate and a bottom plate, wherein the top plate is coupled to a first end of the secondary coil. The switching converter also includes a push-pull current source coupled to the bottom plate of the Y-rated capacitor. The switching converter also includes a controller coupled to the push-pull current source.

18 Claims, 14 Drawing Sheets

US 10,826,403 B1

ACTIVE Y-RATED CAPACITOR CONTROL OPTIONS FOR COMMON-MODE ELECTROMAGNETIC INTERFERENCE (EMI) REDUCTION

BACKGROUND

Power supplies and power converters are used in a variety of electronic systems. Electrical power is generally transmitted over long distances as an alternating current (AC) signal. The AC signal is divided and metered as desired for each business or home location, and is often converted to direct current (DC) for use with individual electronic devices or components. Battery-operated devices are common as well. Modern electronic systems often employ devices or components designed to operate using different DC voltages. Accordingly, different switching converters (AC-DC converters and/or DC-DC converters) are needed for such systems.

There are many different switching converter topologies. The available topologies differ with regard to the components used, the amount of power handled, the input voltage(s), the output voltage(s), efficiency, reliability, size and/or other characteristics. One example switching converter is referred to as a flyback converter. One of the existing challenges for flyback converters is the difficulty of meeting common-mode electromagnetic interference (EMI) specifications for offline flyback converters despite large common-mode chokes. The presence of parasitic capacitances across the transformer boundary makes this a difficult problem to solve. Efforts to improve switching converter designs, such as overcoming the EMI issue noted above, are ongoing.

SUMMARY

In accordance with one example of the disclosure, a system comprises an input voltage supply and a switching converter coupled to the input voltage supply. The switching converter comprises a transformer having a primary coil and a secondary coil. The switching converter also comprises a Y-rated capacitor with a top plate and a bottom plate, wherein the top plate is coupled to a first end of the secondary coil. The switching converter also comprises a push-pull current source coupled to the bottom plate of the Y-rated capacitor. The switching converter also comprises a controller coupled to the push-pull current source.

In accordance with one example of the disclosure, a switching converter circuit comprises a first Y-rated capacitor node and a push-pull current source coupled to the first Y-rated capacitor node. The switching converter circuit also comprises a controller coupled to the push-pull current source. The controller comprises a sample-and-hold circuit coupled to a second Y-rated capacitor node. The controller also comprises an integrator circuit coupled to the sample-and-hold circuit.

In accordance with one example of the disclosure, an integrated circuit comprises a first Y-rated capacitor node and a second Y-rated capacitor node. The integrated circuit also comprises a push-pull current source coupled to the first Y-rated capacitor node. The integrated circuit also comprises a controller coupled to the push-pull current source, wherein the controller is configured to monitor voltage changes at the second Y-rated capacitor node, and to selectively push current to or pull current from the first Y-rated capacitor node.

BRIEF DESCRIPTION OF THE DRAWINGS

For a detailed description of various examples, reference will now be made to the accompanying drawings in which:

FIGS. 8A-1 and 8A-2 is a schematic diagram showing another switching converter in accordance with various examples;

DETAILED DESCRIPTION

Disclosed herein are active Y-rated capacitor control options for common-mode electromagnetic interference (EMI) reduction. As used herein, a Y-rated capacitor refers to a capacitor that complies with safety standards (e.g., failure results in an open circuit rather than a short circuit) to prevent electrical shock hazard. Example Y-rated capacitor standard include UL 1414 and UL 1283. In some examples, the disclosed active Y-rated capacitor control options are used in a switching converter. In one example, a switching converter comprises a transformer having a primary coil and a secondary coil. The switching converter also comprises a Y-rated capacitor with a top plate and a bottom plate, wherein the top plate is coupled to a first end of the secondary coil. The switching converter also comprises a push-pull current source coupled to the bottom plate of the Y-rated capacitor. The switching converter also comprises a controller coupled to the push-pull current source, where the controller provides at least some of the control options described herein. One control option involves selectively pushing current to the bottom plate of the Y-rated capacitor. Another control option involves selectively pulling current from the bottom plate of the Y-rated capacitor. In some examples, the active Y-rated capacitor control options are combined with other switching converter options, such as a discontinuous conduction mode (DCM) circuit (e.g., with a DCM amplifier and/or DCM clamp).

The switching converters described herein have various modes of operation. When the required output power is higher than a pre-determined level, the converters operate in a continuous mode, where pulse-width modulation operations are continuously applied in response to the switching converter's output voltage. A second mode of operation, utilized at lower output power levels, is "burst-mode", where pulse-width modulation operations are turned on and off in response to the switching converter's output voltage.

As used herein, burst-mode operations include a PWM ON mode and PWM OFF mode. To provide a better understanding, various switching converter options are described using the figures as follows.

Figure 1:
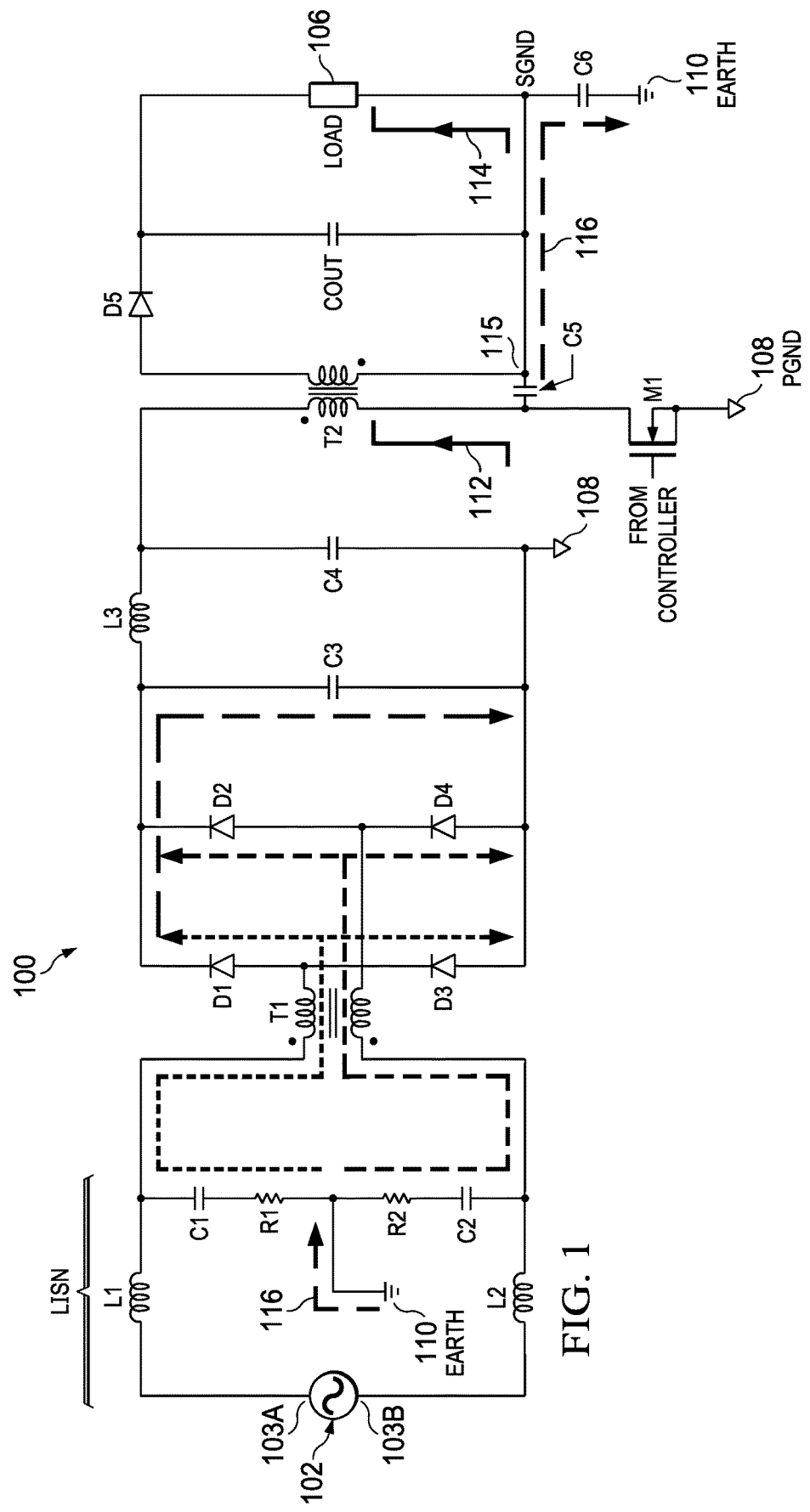
FIG. 1 is a schematic diagram showing a switching converter in accordance with various examples.

FIG. 1 is a schematic diagram showing a switching converter 100 in accordance with various examples. The switching converter 100 is an example of an offline flyback converter. As shown, the switching converter 100 comprises an alternative current (AC) source 102 with a first end 103A coupled to a first winding of a common-mode choke (T1) with a subtractive polarity (represented by dots on the same side of the windings of T1) via a circuit that includes L1, C1, and R1. More specifically, a first end of L1 is coupled to the first end 103A of the AC source 102, while a second end of L1 is coupled to the first winding of T1. The first winding of T1 is also coupled to the top plate of C1. As shown, the bottom plate of C1 is coupled to a first end of R1, and the second end of R1 is coupled to an earth ground node 110.

In the example of FIG. 1, the second end 103B of the AC source 102 is coupled to a second winding of T1 via a circuit that includes L2, C2, and R2. More specifically, a first end of L2 is coupled to the second end 103B of the AC source 102, while a second end of L2 is coupled to the second winding of T1. The second winding of T1 is also coupled to the top plate of C2. As shown, the bottom plate of C2 is coupled to a first end of R2, and the second end of R2 is coupled to the earth ground node 110.

In the example of FIG. 1, the output from T1 is rectified by a set of diodes, D1-D4. More specifically, the anode of D1 and the cathode of D3 are coupled to the first winding of T1. Also, the anode of D2 and the cathode of D4 are coupled to the second winding of T1. Also, the cathodes of D1 and D2 are coupled to the top plate of a capacitor (C3) and the first end of an inductor (L3). Also, the anodes of D3 and D4 are coupled to the bottom plate of C3 and to a primary (local) ground node 108. As shown, the second end of L3 is coupled to the top plate of another capacitor (C4) and to the first winding of a transformer (T2) with an additive polarity (represented by dots on opposite sides of the windings of T2). Also, the bottom plate of C4 is coupled to the primary ground node 108. Meanwhile, the second winding of T2 has a first end coupled to the anode of a diode (D5), and a second end coupled to a secondary ground node 115. As shown, the cathode of D5 is coupled to the top plate of an output capacitor (COUT) and to a load 106 in parallel with COUT. Specifically, the top plate of COUT is coupled to the cathode of D5, and the bottom plate of COUT is coupled to the secondary ground node 115.

In the example of FIG. 1, the amount of power provided to the load 106 is controlled by turning a transistor, M1, on and off. As shown, M1 has a first current terminal coupled to a first winding of T2, a second current terminal coupled to the primary ground node 108, and a control terminal coupled to a controller (not shown) for the switching converter 100. Also shown in FIG. 1 are two additional capacitors, C5 and C6, where C5 represents the inter-winding capacitance of T2, and where C6 represents stray capacitances between the secondary ground node 115 and the earth ground node 110. During switching operations of M1, voltage changes 112 at the first winding of T2 result in voltage changes 114 at the node 115. Due to C5 and C6, the switching operations of M1 and the related voltage changes 114, currents 116 are injected from secondary ground node 115 to the earth ground node 110. These currents 116 flow back from node 110 through the resistors R1 and R2 of the line impedance stabilization network (LISN). The resultant voltage drops across R1 and R2 are a significant contributor to the measured EMI. Such EMI is undesirable.

Figure 2:
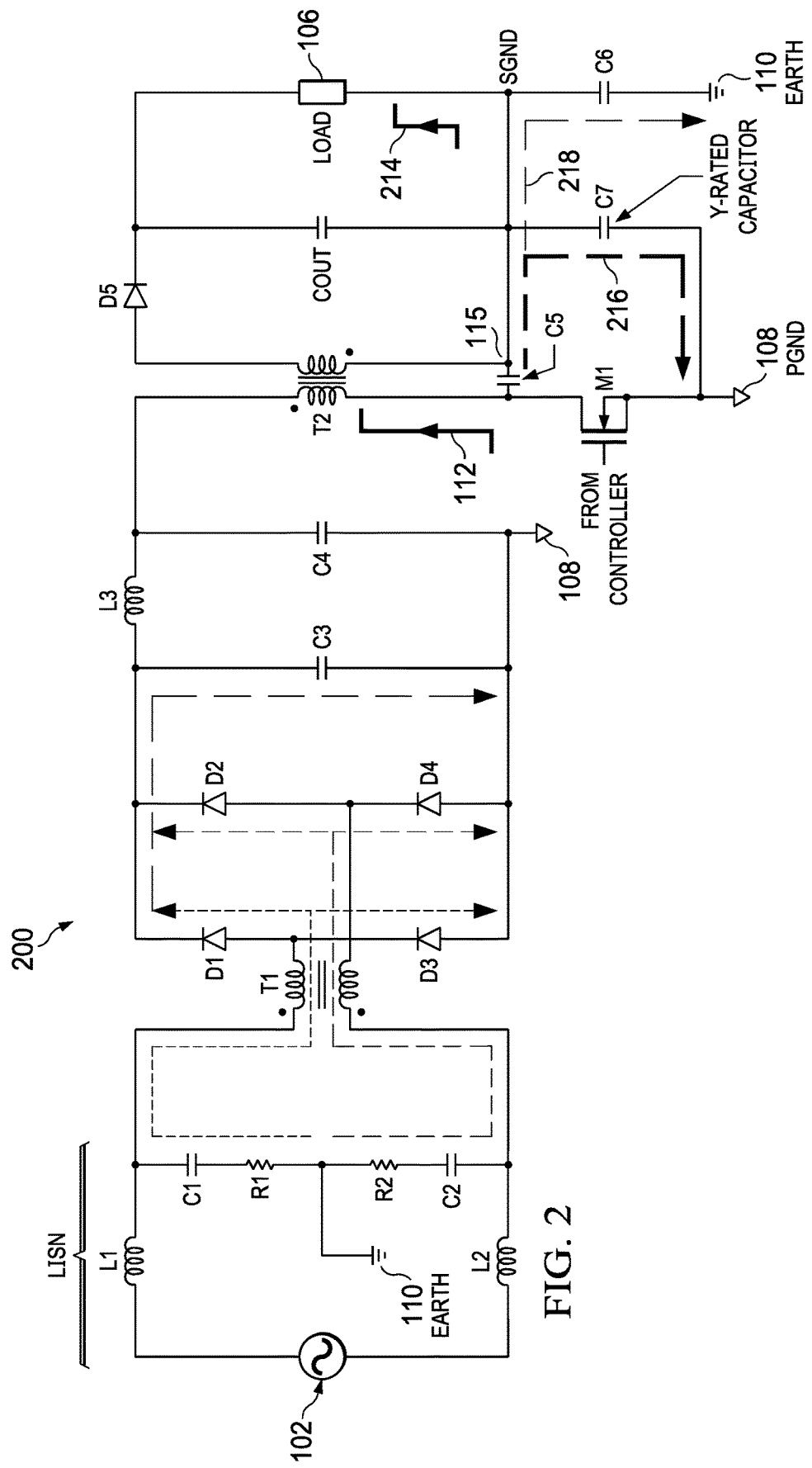
FIG. 2 is a schematic diagram showing another switching converter in accordance with various examples.

FIG. 2 is a schematic diagram showing another switching converter 200 in accordance with various examples. In the example of FIG. 2, the switching converter 200 includes many of the same components described for the switching converter 100 of FIG. 1. In addition, the switching converter 200 includes a Y-rated capacitor (C7) coupled between the secondary ground node 115 and the primary ground node 108. During switching operations of M1, voltage changes 112 at the first winding of T2 result in voltage changes 214 at the secondary ground node 115. Due to C5 and C6, the switching operations of M1 and the related voltage changes 214 are a contributor to LISN EMI measured across R1 and R2. With C7, the voltage changes 214 at the node 115 are reduced compared to the voltage changes 114 of FIG. 1, which reduces the LISN EMI for the switching converter 200 compared to the switching converter 100 of FIG. 1. In the example of FIG. 2, C7 provides a current flow path 216 to the primary ground node 108 that reduces the amount of current along the current flow path 218 to the earth ground node 110 via C6.

Figure 3A:
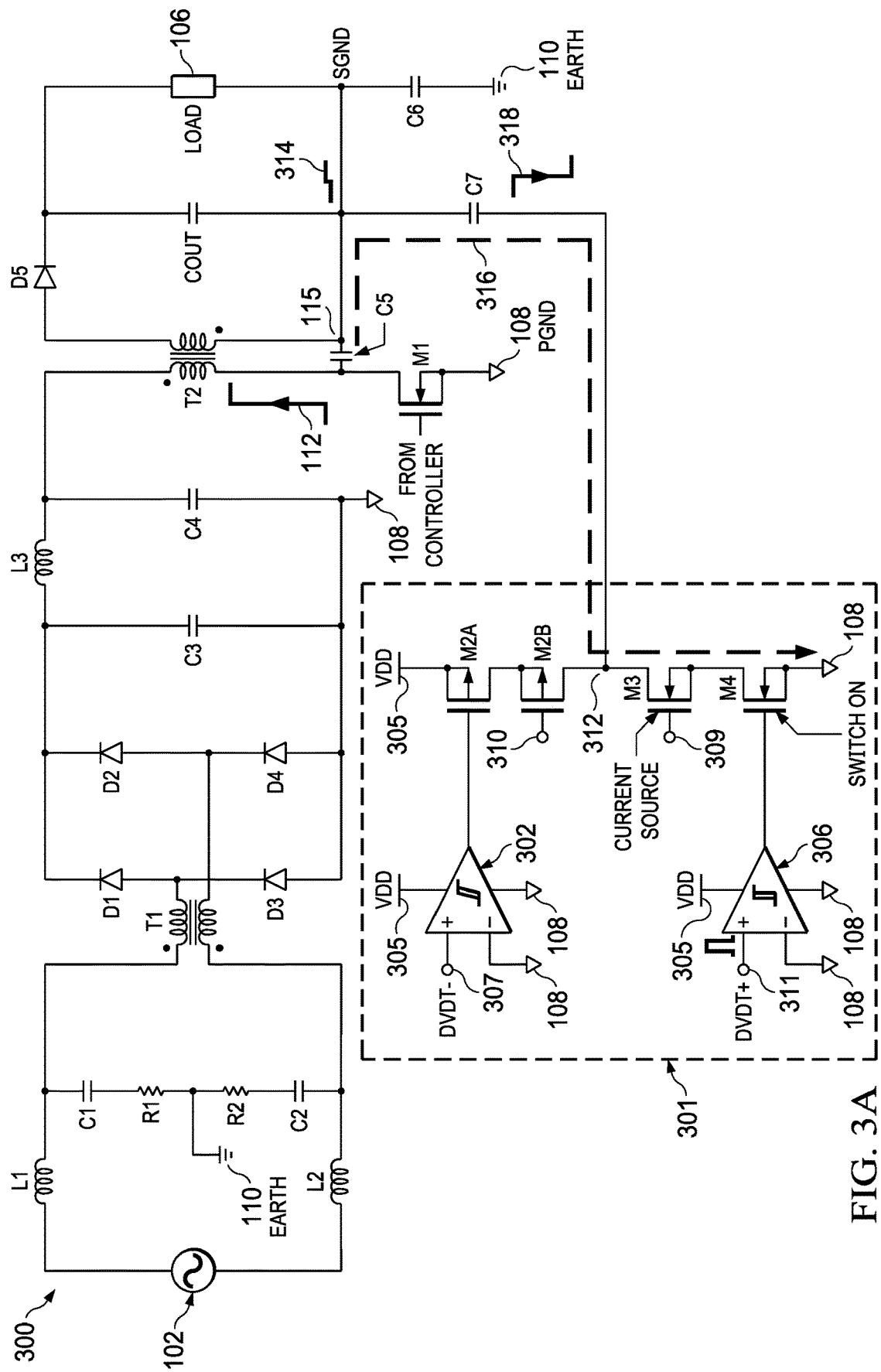
FIG. 3A is a schematic diagram showing another switching converter in a pull operation scenario in accordance with various examples.

FIG. 3A is a schematic diagram showing another switching converter 300 in a pull operation scenario in accordance with various examples. In the example of FIG. 3A, the switching converter 300 includes many of the same components described for the switching converters 100, 200 of FIGS. 1 and 2. In addition, the switching converter 300 includes a push-pull current source 301 coupled to the bottom plate of C7. In the example of FIG. 3A, the push-pull current source 301 includes four transistors, M2A, M2B, M3, and M4. As shown, the first current terminal of M2A is coupled to an input voltage supply (VDD) node 305, the second current terminal of the M2A is coupled to the first current terminal of M2B (referred to herein as a push adjustment transistor), and the control terminal of M2A is coupled to a driver circuit 302. In the example of FIG. 3A, the driver circuit 302 is powered by an input voltage supply (VDD) provided by node 305. In operation, the driver circuit 302 selectively provides a drive signal to M2 based on VDD in response to a control signal (DVDT−) input to node 307 to perform a push operation (see e.g., FIG. 3B). In some examples, DVDT− is a digital signal that goes high when the drain of M1 swings down. In such examples, "DVDT" stands for the dv/dt at the drain of M1. Note: FIG. 3A only represents operations involving the drain of M1 swinging up.

In the example of FIG. 3A, the second current terminal of M2B is coupled to the first current terminal of M3. Meanwhile, the control terminal of M2B is coupled to a control node 310. Also, the second current terminal of M3 is coupled to the first current terminal of M4, and the control terminal of M3 is coupled to a control node 309. As shown, the node 312 between the second current terminal of M2B and the first current terminal of M3 is coupled to the bottom plate of C7. Also, the second current terminal of M4 is coupled to the primary ground node 108, and the control terminal of M4 is coupled to a driver circuit 306. In the example of FIG. 3A, the driver circuit 306 is powered by an input voltage supply (VDD) provided by node 305. During a pull operation as represented in FIG. 3A, the driver circuit 306 provides a drive signal to M4 based on VDD in response to a control signal (DVDT+) input to node 311, where DVDT+ is a digital signal that goes high when the drain of transistor M1 swings up. The result of the pull operation is that current flows as represented by current flow path 316.

With the pull operations represented in FIG. 3A, voltage changes 112 at the first winding of T2 result in reduced voltage changes 314 at the secondary ground node 115. Due to C5 and C6, the switching operations of M1 and the related voltage changes 314 are a contributor to EMI measured across the LISN resistors, R1 and R2. However, with C7 and the push-pull current source 301, the voltage changes 314 at the node 115 are reduced compared to the voltage changes 114 of FIG. 1, or the voltage changes 214 of FIG. 2. In the example of FIG. 3A, the voltage changes 314 are reduced by using the push-pull current source 301 to pull current from the bottom plate of C7 through the transistors M3 and M4 to the primary ground node 108. This reduces the voltage changes 314 at the secondary ground node 115 due to a voltage change 318 of inverted polarity at the bottom plate of C7. By reducing the voltage changes 314 at the secondary ground node 115, the amount of current that flows to the earth ground node 110 from the secondary ground node 115 via C6 is also reduced. In this manner, the LISN EMI is reduced. Note: the example voltage changes 112, 314, and 318 in FIG. 3A are not to scale. In some scenarios, the voltage changes 318 could be as small as $1/100^{th}$ of the voltage changes 112.

Figure 3B:
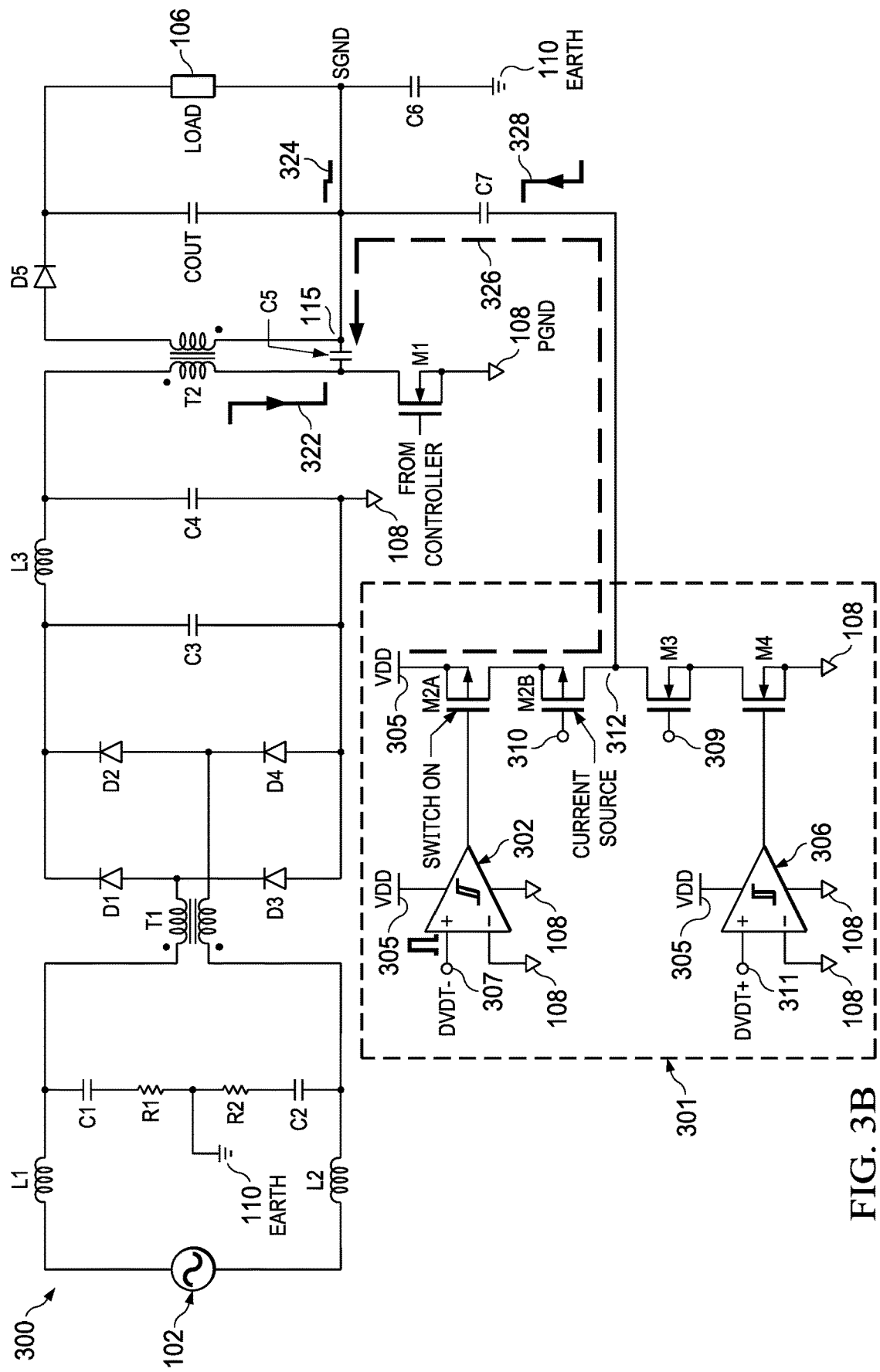
FIG. 3B is a schematic diagram showing the switching converter of FIG. 3A in a push operation scenario in accordance with various examples.

FIG. 3B is a schematic diagram showing the switching converter 300 of FIG. 3A in a push operation scenario in accordance with various examples. In the example of FIG. 3B, the switching converter 300 includes many of the same components described for the switching converters 100, 200 of FIGS. 1 and 2. Again, the switching converter 300 includes a push-pull current source 301 coupled to the bottom plate of C7. In the example of FIG. 3B, the push-pull current source 301 performs a push operation that allows current to flow as represented by the current flow path 326. More specifically, the driver circuit 302 directs M2A to close in response to DVDT− going high (an indication that M1 is swinging down). Also, M2B allows current flow while M3 and M4 are open and thus prevent current flow to the primary ground node 108. With M2A and M2B closed and M3 and/or M4 open, current is pushed to the bottom plate of C7. With M2B the amount of current flow during a push operation is adjustable between a minimum current flow and a maximum current. In other examples, M2B is replaced by a resistor, which corresponds to a maximum current in use for the push operation (relative to using M2B).

With the push operations, voltage changes 322 at the first winding of T2 result in reduced voltage changes 324 at the secondary ground node 115. Due to C5 and C6, the switching operations of M1 and the related voltage changes 324 are a contributor to EMI measured across the LISN resistors, R1 and R2. However, with C7 and the push-pull current source 301, the voltage changes 324 at the node 115 are reduced compared to the voltage changes 114 of FIG. 1, or the voltage changes 214 of FIG. 2. In one example, the voltage changes 324 are reduced by using the push-pull current source 301 to push current to the bottom plate of C7 through the transistors M2A and M2B from the VDD node 305. This reduces the voltage changes 324 at the secondary ground node 115 due to a voltage change 328 of inverted polarity at the bottom plate of C7. By reducing the voltage changes 324 at the secondary ground node 115, the amount of current that flows to the earth ground node 110 from the secondary ground node 115 via C6 is also reduced. In this manner, the LISN EMI is reduced. Note: the example voltage changes 322, 324, and 328 in FIG. 3B are not to scale. In some scenarios, the voltage changes 328 could be as small as $1/100^{th}$ of the voltage changes 322.

Figure 4:
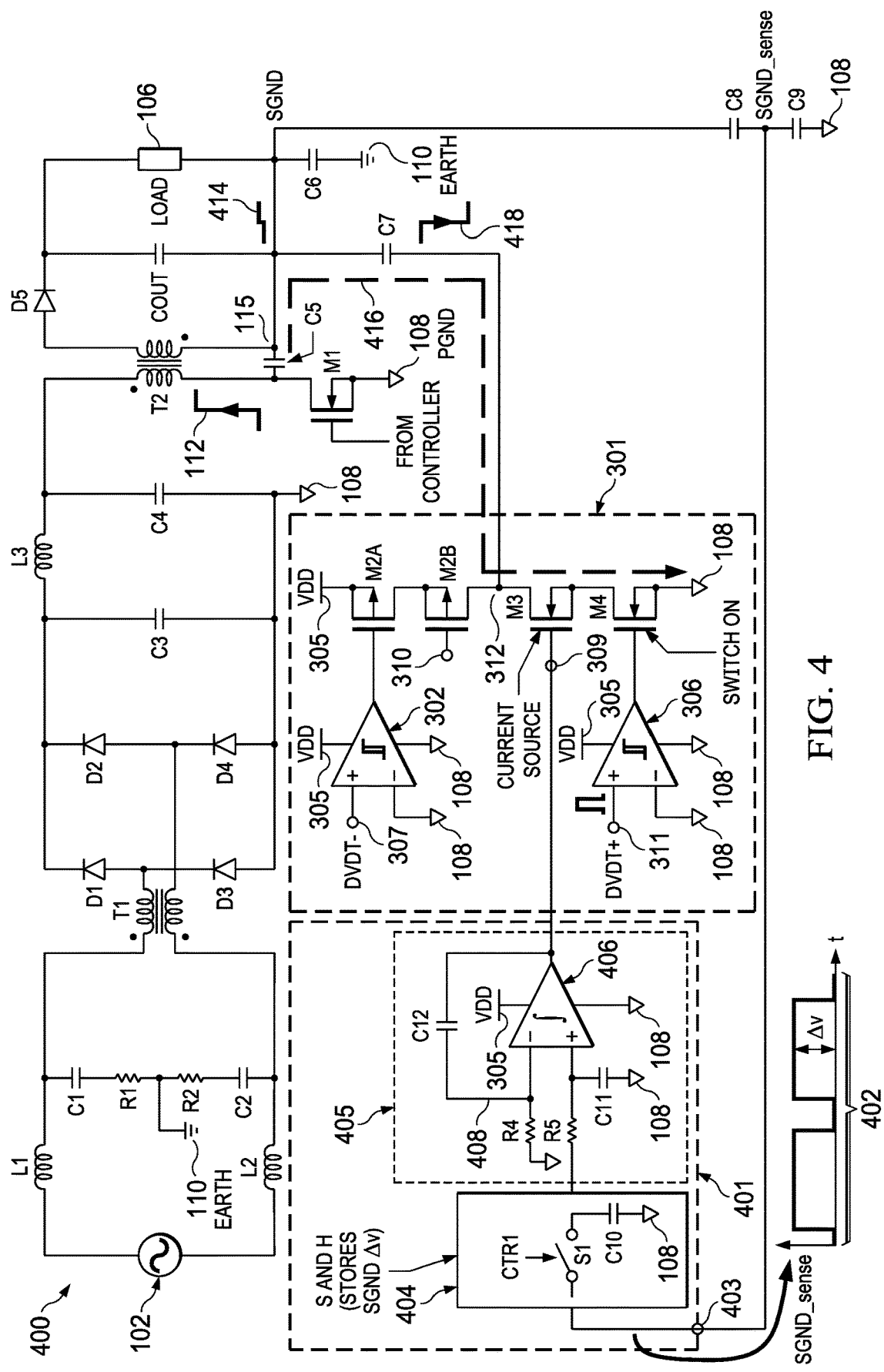
FIG. 4 is a schematic diagram showing another switching converter in accordance with various examples.

FIG. 4 is a schematic diagram showing another switching converter 400 in accordance with various examples. In the example of FIG. 4, the switching converter 400 includes many of the same components described for the switching converters 100, 200, and 300 of FIGS. 1-3. In addition, the switching converter 400 includes a controller 401 for the push-pull current source 301 coupled to the bottom plate of C7.

As shown, the controller 401 includes a sample-and-hold (S&H) circuit 404 coupled to an integrator circuit 405. More specifically, the S&H circuit 404 includes a switch (S1) and a capacitor (C10), where S1 is coupled between an input node 403 of the controller 401 and the top plate of C10. Meanwhile, the bottom plate of C10 is coupled to the primary ground node 108. In the example of FIG. 4, the input node 403 of the controller 401 is coupled to a sense arrangement that includes C8 and C9. In some examples, C7 is a first Y-rated capacitor and C8 is a second Y-rated capacitor of the switching converter 400. As shown, the top plate of C8 is coupled to the secondary ground node 115 and the bottom plate of C8 is coupled to the top plate of C9. Also, the bottom plate of C9 is coupled to the primary ground node 108. With C8 and C9, a sense signal 402 related to the voltage changes 414 is provided to the S&H circuit 404.

The output of the S&H circuit 404 is provided to the integrator circuit 405. As shown, the integrator circuit 405 includes a resistor (R5) and a capacitor (C11) at the positive input (+) node of an operational amplifier 406. More specifically, R5 is between the output of the S&H circuit 404 and the + node of the operational amplifier 406. Also, C11 is between the + node of the operational amplifier 406 and the primary ground node 108. The integrator circuit 405 also includes a resistor (R4) at the negative input (−) node of the operational amplifier 406. In the example of FIG. 4, the integrator circuit 405 also includes a feedback loop 408 with a capacitor (C12) between the output of the operational amplifier 406 and the − node of the operational amplifier 406. The output of the integrator circuit 405 is coupled to the control node 309 at the control terminal for M3.

During switching operations of M1, voltage changes 112 at the first winding of T2 result in voltage changes 414 at the node 115. Due to C5 and C6, the switching operations of M1 and the related voltage changes 414 are a contributor to EMI measured across LISN resistors, R1 and R2. With C7-C9, the push-pull current source 301, and the controller 401, the voltage changes 414 at the node 115 are reduced compared to the voltage changes 114 of FIG. 1, or the voltage changes 214 of FIG. 2. In one example, the voltage changes 414 are the result of the controller 401 directing the push-pull current source 301 to pull current from the bottom plate of C7 when voltage changes 414 are present at the node 115 as indicated by the sense signal 402. In some examples, the operations of the controller 401 and the push-pull current source 301 cause the voltage changes at the node 115 to be reduced by an amount 418, resulting in the voltage changes 414. In the example of FIG. 4, C7 provides a current flow path 416 to the primary ground node 108 via M3 and M4, which reduces the amount of current that flows to the secondary ground node 110 via C6. In this manner, the EMI measured across the LISN resistors, R1 and R2, is reduced.

FIGS. 5A-5D are timing diagrams showing waveforms related to a switching converter in accordance with various examples. In the timing diagram 510 of FIG. 5A, the waveform 512 represents a primary drain voltage (e.g., the voltage at the first current terminal of M1). As shown, the primary drain voltage transitions between low and high voltage values (e.g., 0 to ~300 volts) as represented by pulses 514A-514C, where the control signal for M1 determines the timing of the pulses 514A-514C.

Figure 5A:
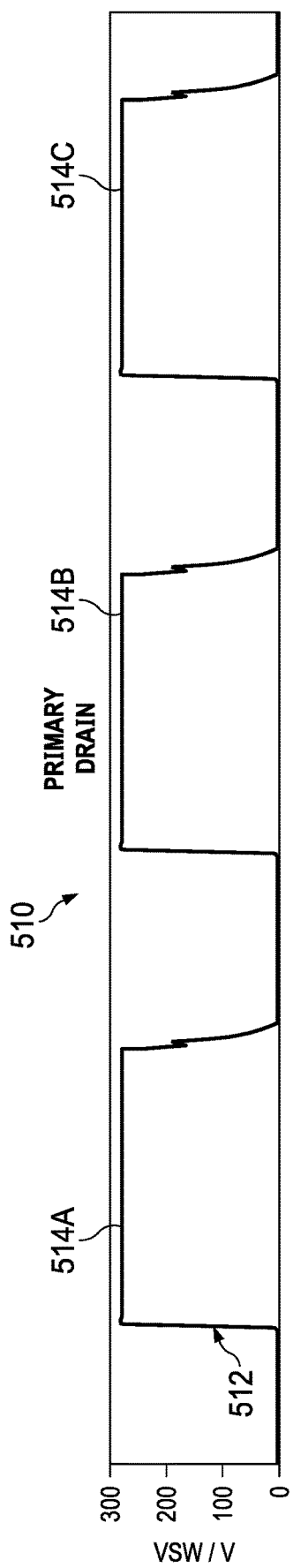
FIGS. 5A-5D are timing diagrams showing waveforms related to a switching converter in accordance with various examples.
Figure 5B:
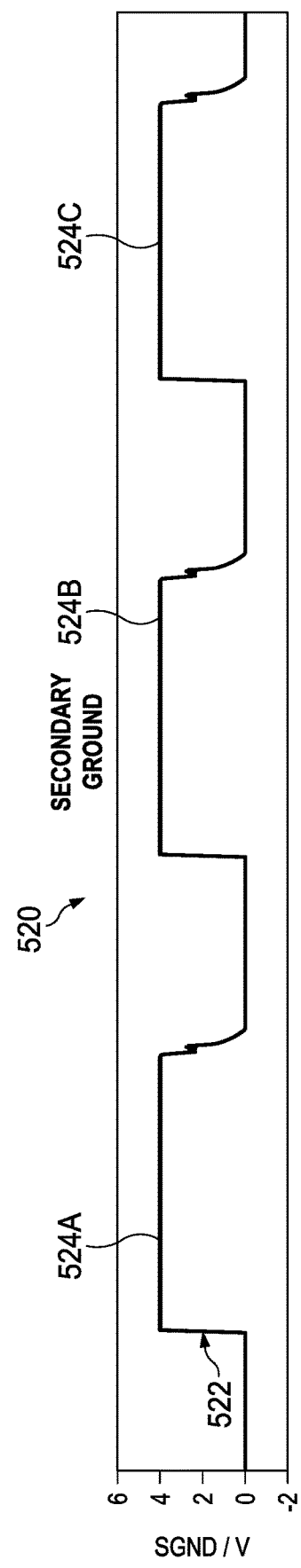

In the timing diagram 520 of FIG. 5B, the waveform 522 represents a secondary ground voltage (e.g., the voltage at the node 115) when a Y-rated capacitor (e.g., C7) is used. As shown, the secondary ground voltage transitions between low and high voltages (e.g., 0 to ~4 volts) represented by pulses 524A-524C, where the control signal for M1 determines the timing of the pulses 524A-524C.

Figure 5C:
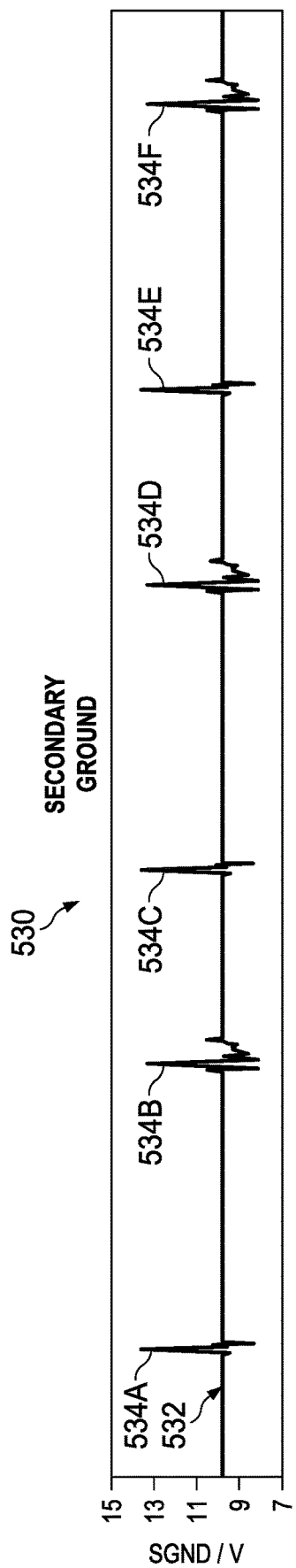

In the timing diagram 530 of FIG. 5C, the waveform 532 represents a secondary ground voltage (e.g., the voltage at the node 115) when a Y-rated capacitor (e.g., C7) and an active push-pull current source (e.g., the push-pull current source 301 with a controller 401 as in FIG. 4) is used. As shown, the secondary ground voltage represented by the waveform 532 is reduced to brief pulses 534A-534F corresponding to each low-to-high and high-to-low transition of the primary drain voltage represented in the timing diagram 510 of FIG. 5A.

Figure 5D:
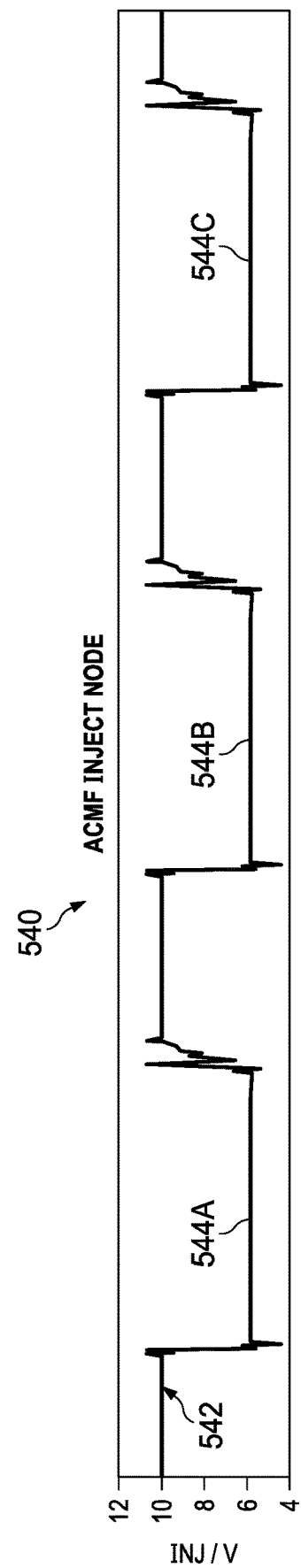

In the timing diagram 540 of FIG. 5D, the waveform 542 represents a control signal (e.g., from the controller 401) provided to the control node 309 at the control terminal for M3. As shown, the waveform 542 includes pulses 544A-544C that are inverted relative to the pulses 514A-514C of the primary drain voltage represented in the timing diagram 510 of FIG. 5A.

Figure 6A:
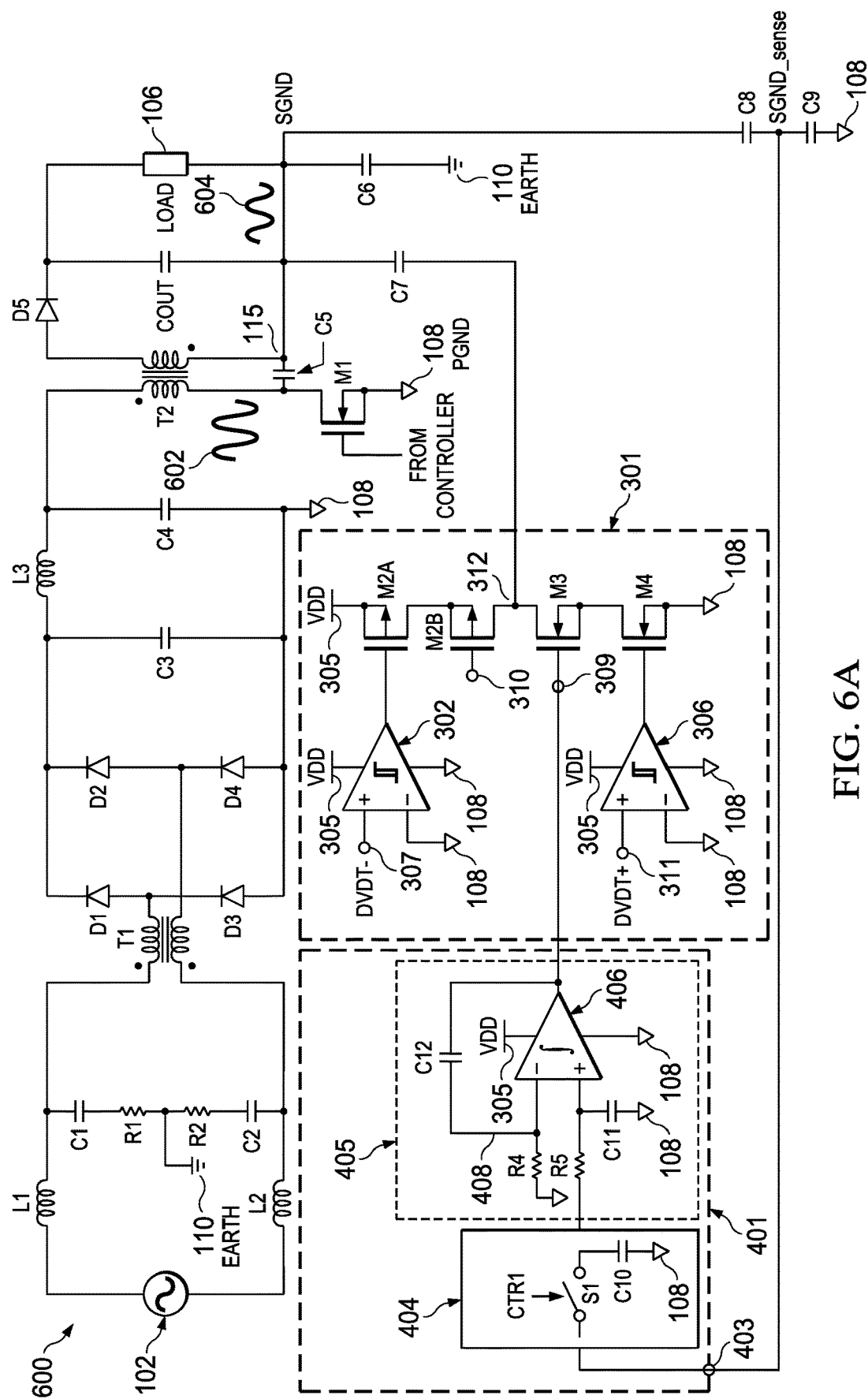
FIG. 6A is a schematic diagram showing another switching converter in accordance with various examples.

FIG. 6A is a schematic diagram showing another switching converter 600 in accordance with various examples. In the example of FIG. 6A, the switching converter 600 includes the same components described for the switching converter 400 of FIG. 4, where the difference between FIG. 6A and FIG. 4 is that a sinusoidal signal 602 exists at the first coil of T2 in FIG. 6A instead of a square wave pulse (or other non-sinusoidal pulse) corresponding to the voltages changes 112. The sinusoidal signal 602 can exist due to resonant oscillations during the converter "off" phase when the switching converter 600 is controlled in burst-mode (also called PWM on/off control). The sinusoidal signal 602 and its related voltage changes are referred to as discontinuous conduction mode (DCM) ringing. The DCM ringing results in sinusoidal voltage changes 604 at the node 115. As represented in FIGS. 6A and 4, the sinusoidal voltage changes 604 are not as effectively reduced as the voltage changes 414 using C7, the push-pull current source 301, and the controller 401. In some examples, C7 is a first Y-rated capacitor and C8 is a second P-rated capacitor of the switching converter 600.

Figure 6B:
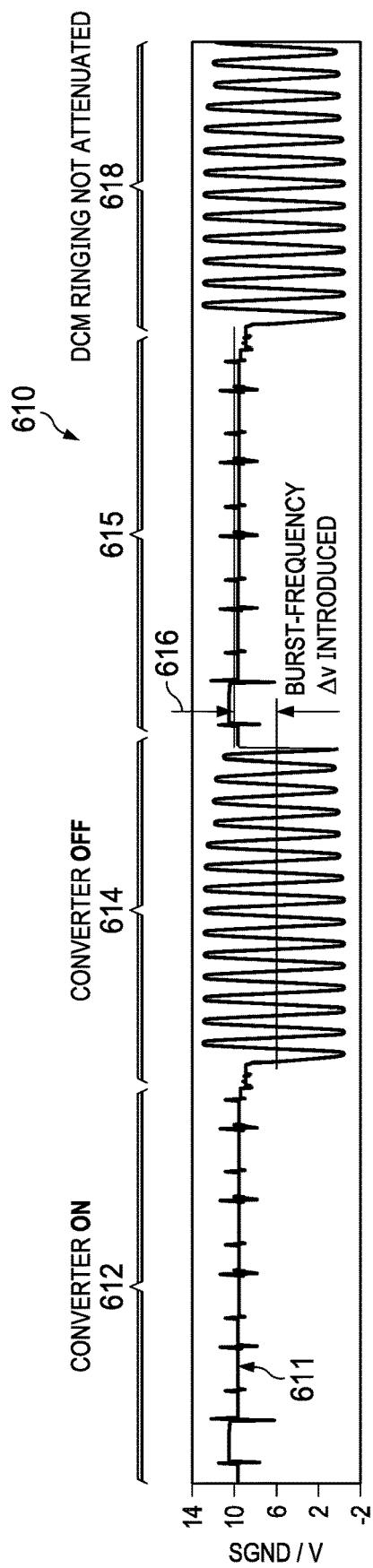
FIG. 6B is a timing diagram related to the switching converter of FIG. 6A in accordance with various examples.

FIG. 6B is a timing diagram 610 related to the switching converter 600 of FIG. 6A in accordance with various examples. In the timing diagram 610, a secondary ground waveform 611 is represented during burst-mode operation. More specifically, during a converter "on" phase 612, the secondary ground voltage is at a fixed voltage (approximately 10V in FIG. 6B) with brief and small-valued pulses, as maintained by the action of the push-pull current source described above. During a converter "off" phase 614, the secondary ground voltage rings between a high voltage (e.g., around 12V) and a low voltage (e.g., around 0V). In this phase, there are no switching edges and the push-pull is not active. Hence, the ringing is not attenuated. In the next "on" phase 615, the secondary ground voltage returns to the approximately fixed voltage by the introduction of a burst-frequency voltage change 616. In the next "off" phase 618, the secondary ground voltage again rings between a high voltage (e.g., around 12V) and a low voltage (e.g., around 0V). The ringing represented in FIG. 6B results in undesired EMI measured across the LISN resistors, R1 and R2. The burst-frequency voltage changes 616 represented in FIG. 6B results in additional undesired EMI measured across the LISN resistors, R1 and R2.

Figure 7:
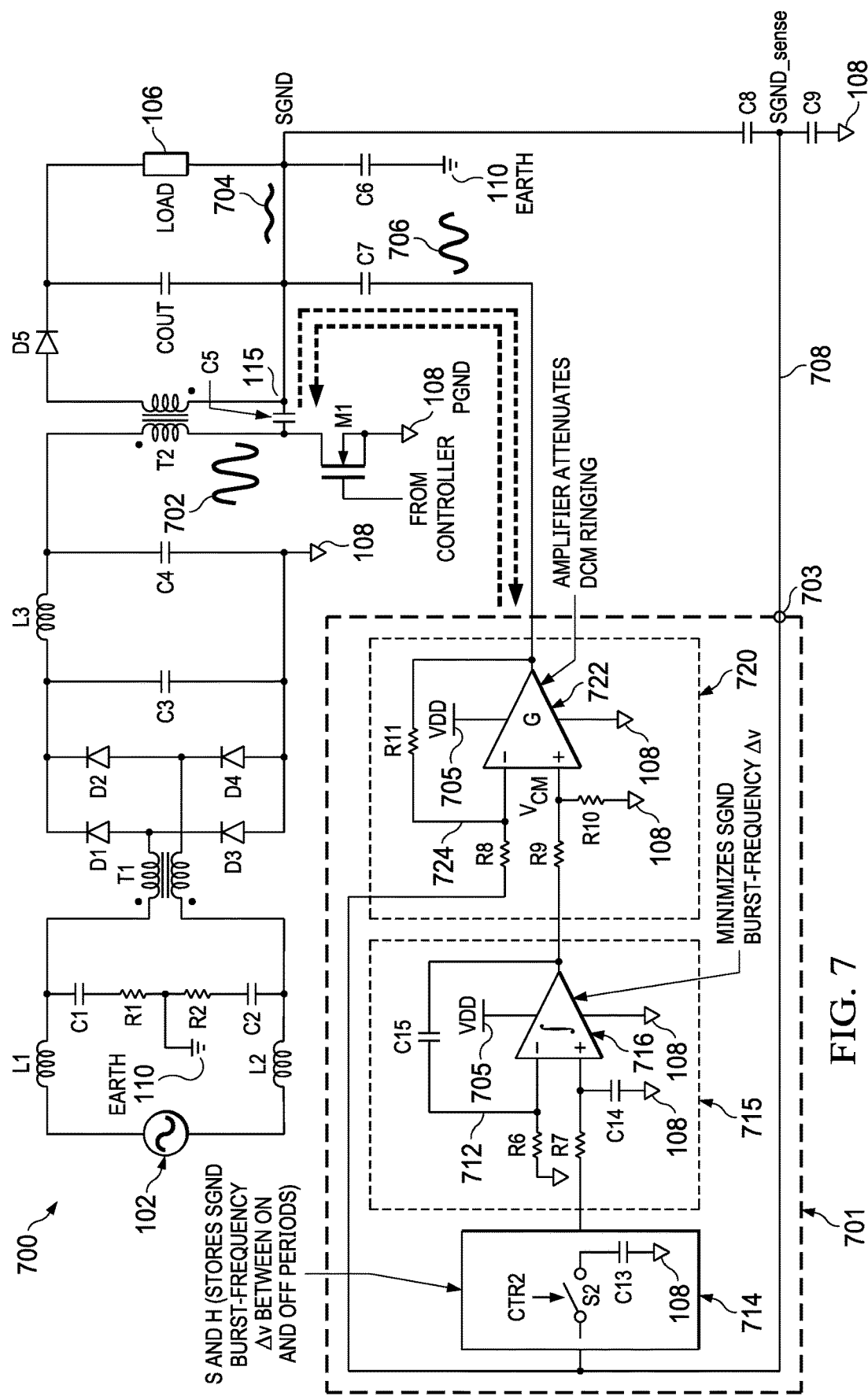
FIG. 7 is a schematic diagram showing another switching converter in accordance with various examples.

FIG. 7 is a schematic diagram showing another switching converter 700 in accordance with various examples. In the example of FIG. 7, the switching converter 700 includes many of the same components described for the switching converters 100, 200, 300, and 400 of FIGS. 1-4. Also, in the example of FIG. 7, the switching converter 700 includes a DCM circuit 701 coupled to the bottom plate of C7 instead of the push-pull current source 301.

As shown, the DCM circuit 701 includes an S&H circuit 714 coupled to an integrator circuit 715. More specifically, the S&H circuit 714 includes a switch (S2) and a capacitor (C13), where S2 is coupled between an input node 703 of the amplifier circuit 701 and the top plate of C13. Meanwhile, the bottom plate of C13 is coupled to the primary ground node 108. In the example of FIG. 7, the input node 703 of the DCM circuit 701 is coupled to a sense arrangement that includes C8 and C9. With C8 and C9, a sense signal 708 related to the burst-frequency voltage change 616 (see FIG. 6B) is provided to the S&H circuit 714.

The output of the S&H circuit 714 is provided to the integrator circuit 715. As shown, the integrator circuit 715 includes a resistor (R7) and a capacitor (C14) at the positive input (+) node of an operational amplifier 716. More specifically, R7 is between the output of the S&H circuit 714 and the + node of the operational amplifier 716. Also, C14 is between the + node of the operational amplifier 716 and the primary ground node 108. The integrator circuit 715 also includes a resistor (R6) at the negative input (−) node of the operational amplifier 716. In the example of FIG. 7, the integrator circuit 715 also includes a feedback loop 717 with a capacitor (C15) between the output of the operational amplifier 716 and the − node of the operational amplifier 716. The output of the integrator circuit 715 is coupled to an amplifier circuit 720.

As shown, the amplifier circuit 720 includes two resistors (R9 and R10) at the positive input (+) node of an operational amplifier 722. More specifically, R9 is between the output of the integrator circuit 715 and the + node of the operational amplifier 722. Also, R10 is between the + node of the operational amplifier 722 and the primary ground node 108. The amplifier circuit 720 also includes a resistor (R8) at the negative input (−) node of the operational amplifier 722. As shown, the − node of the operational amplifier 722 is coupled to the input node 703 of the DCM circuit 701 via R8. In the example of FIG. 7, the amplifier circuit 720 also includes a feedback loop 724 with a resistor (R11) between the output of the operational amplifier 722 and the − node of the operational amplifier 722. As shown, the operational amplifiers 716 and 722 are powered by an input supply voltage (VDD) node. In the example of FIG. 7, the values of R8-R11 determine the gain for the amplifier circuit 720. In operation, the S&H circuit 714 stores the secondary ground burst-frequency voltage change (ΔV) between "on" and "off" periods. The integrator circuit 715 minimizes this burst-frequency voltage change (ΔV) by creating an appropriate DC reference voltage for the amplifier circuit 720, such that the DC component of the voltage at the output node of the amplifier (which is also the bottom plate of the Y-capacitor C7) equalizes between the converter "on" and "off" phases. In addition, the amplifier circuit 720 attenuates the sinusoidal DCM ringing by sensing the sinusoidal ringing 704 at the secondary ground node 115 and by creating an out-of-phase sinusoidal signal 706 at the bottom plate of the Y-rated capacitor C7. In some examples, C7 is a first Y-rated capacitor and C8 is a second Y-rated capacitor of the switching converter 700.

Figure 8B:
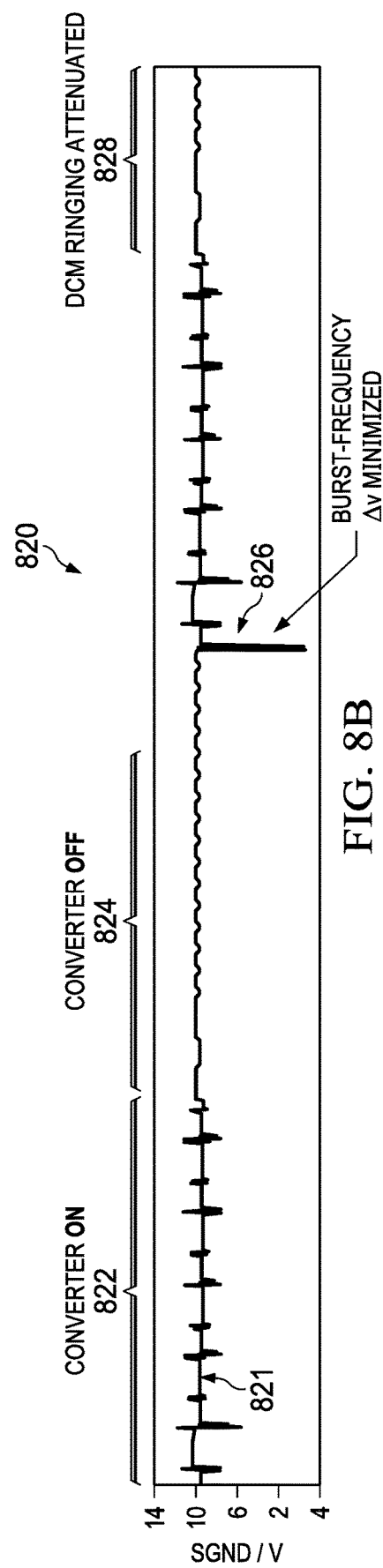
FIG. 8B is a timing diagram related to the switching converter of FIG. 8A in accordance with various examples.
Figures 1, 8A:
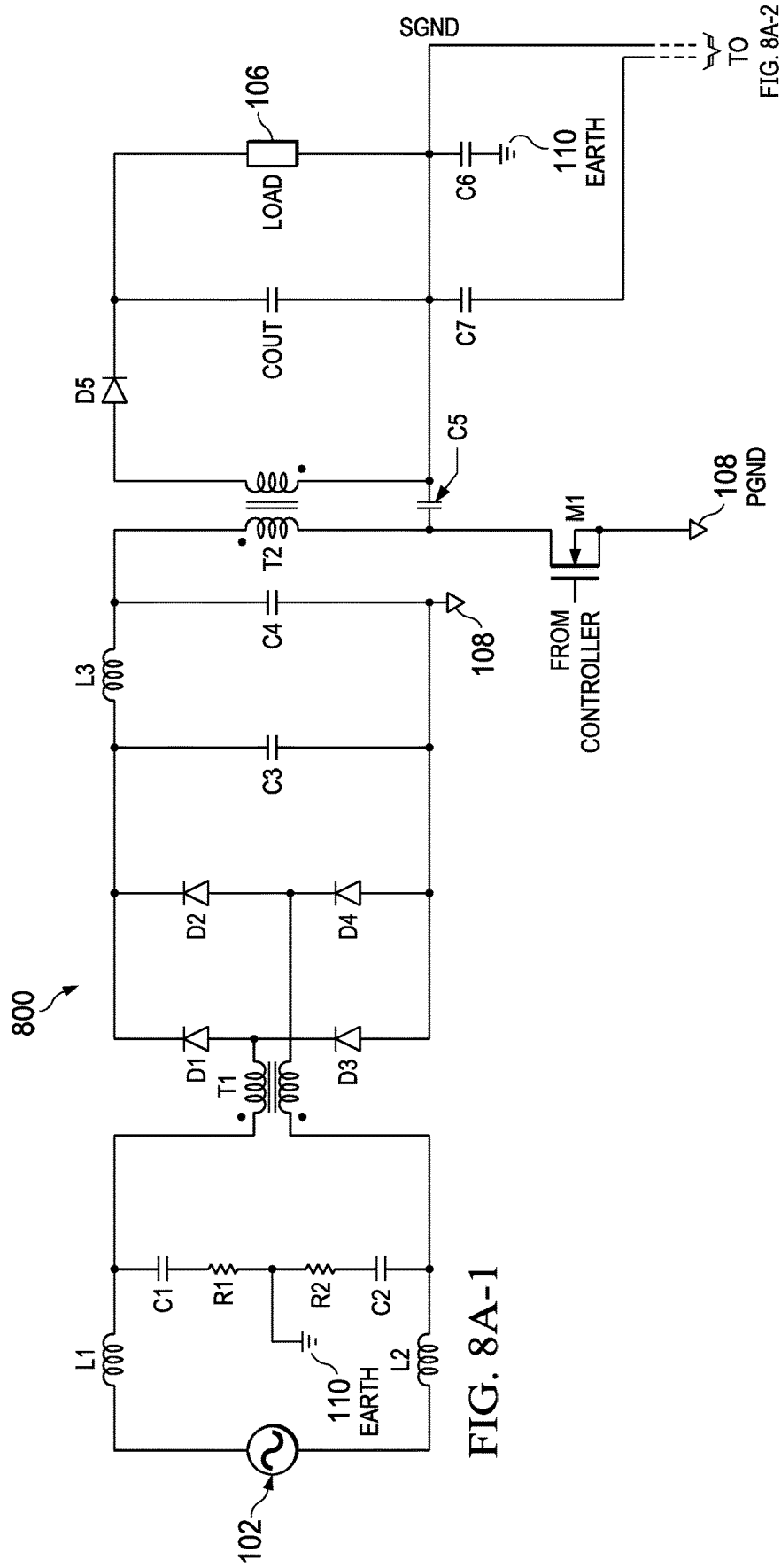
Figures 2, 8A:
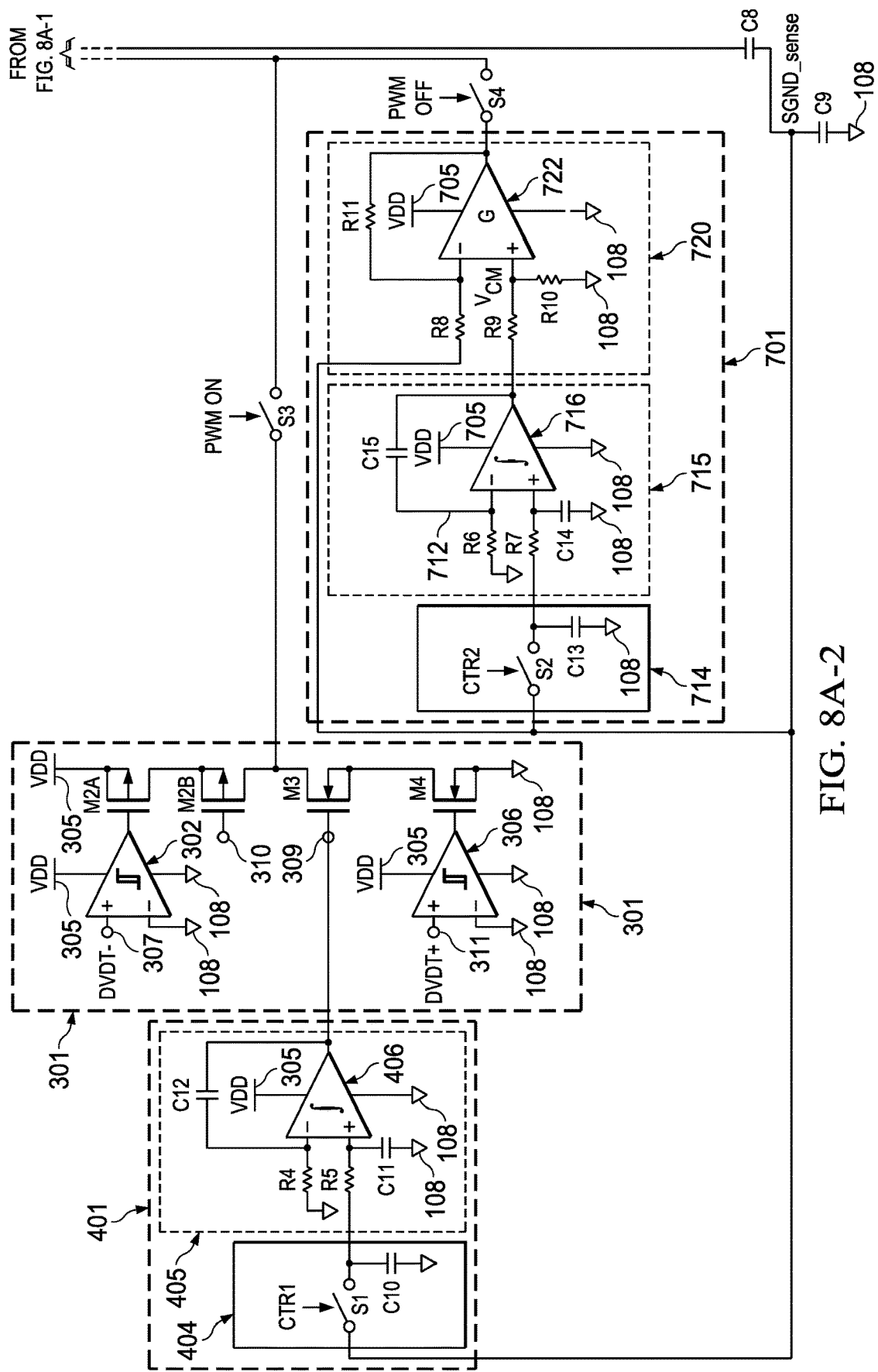

FIGS. 8A-1 and 8A-2 is a schematic diagram showing another switching converter 800 in accordance with various examples. In the example of FIGS. 8A-1 and 8A-2, the switching converter 800 includes many of the same components described for the switching converters 100, 200, 300, 400, 600, and 700 of FIGS. 1-4, 6, and 7. In some examples, C7 is a first Y-rated capacitor and C8 is a second Y-rated capacitor of the switching converter 800. As shown in FIGS. 8A-1 and 8A-2, the switching converter 800 includes the push-pull current source 301 and the DCM circuit 701 coupled to the bottom plate of C7 via respective switches, S3 and S4. More specifically, S3 is closed during the "on" phase of the switching converter 800 so that the push-pull current source 301 can selectively push current to or pull current from the bottom plate of the C7. Meanwhile, S4 is open during of the "on" phase of the switching converter 800. In contrast, S4 is closed during the "off" phase of the switching converter 800 so that the DCM circuit 701 can apply a current to the bottom plate of the C7 to reduce secondary ground signal ringing during the "off" phase. Also, S3 is open during the "off phase" of the switching converter 800.

In some examples, during PWM-based switching operations of M1, the push-pull current source 301 and the controller 401 operate to reduce voltage changes (e.g., the voltage changes 414 in FIG. 4) applied to the secondary ground node 110 as described herein. Also, during burst-mode switching operations of M1 (when the switching converter is periodically turned on and off), the DCM circuit 701 operates to reduce secondary ground signal ringing as described herein.

FIG. 8B is a timing diagram 820 related to the switching converter of FIG. 8A in accordance with various examples. In the timing diagram 820, a secondary ground waveform 821 is represented during different converter operations. More specifically, during a converter "on" phase, the secondary ground voltage is at a fixed voltage (approximately 10V in FIG. 8B) due to the operations of the push-pull current source 301 and the controller 401. During a converter "off" phase, the secondary ground voltage stays at the fixed voltage due to minimization of burst-frequency voltage change and attenuation of secondary ground voltage DCM ringing by the operations of the DCM circuit 701.

Figure 9A:
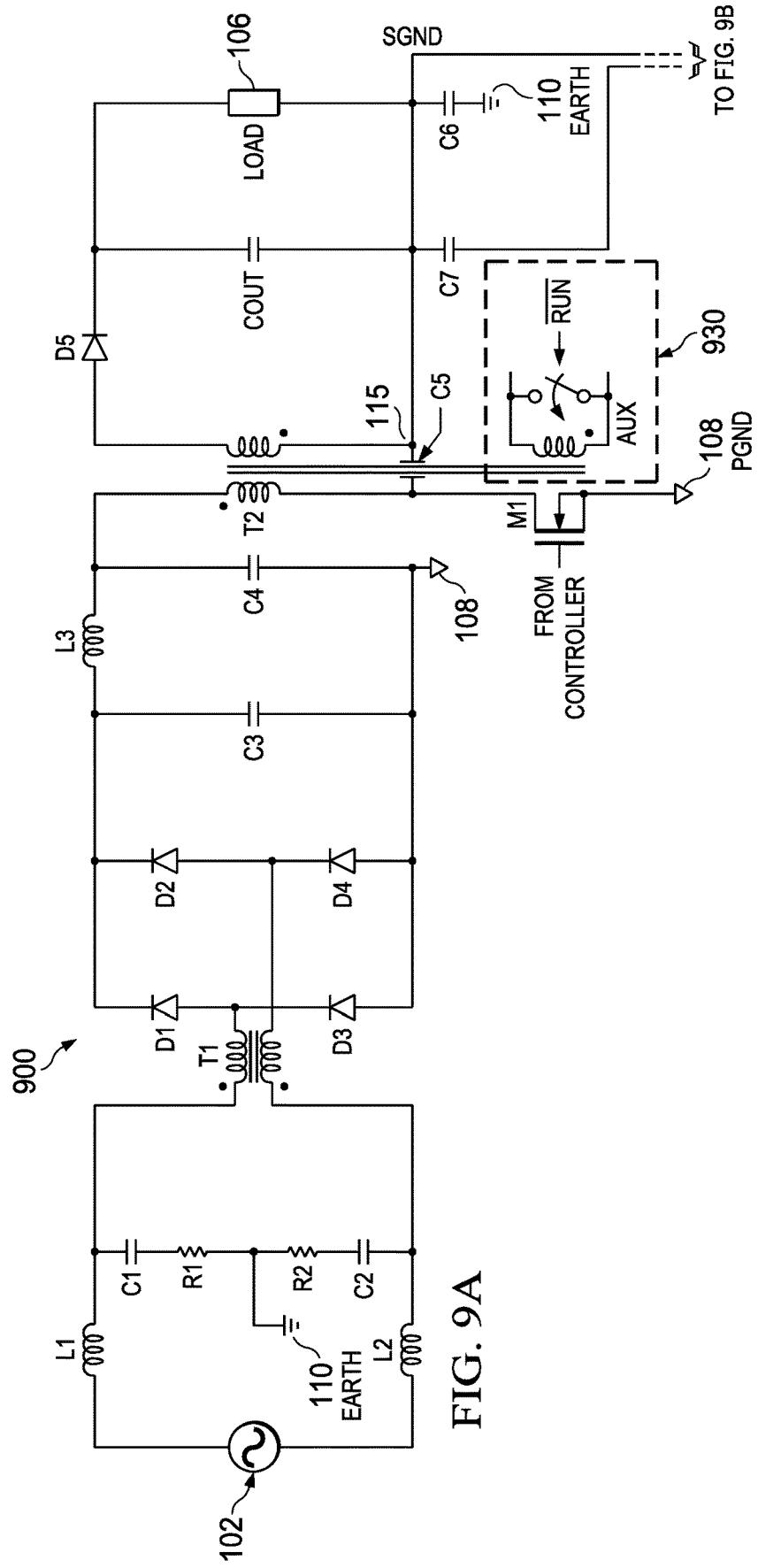
FIGS. 9A and 9B is a schematic diagram showing another switching converter in accordance with various examples.
Figure 9B:
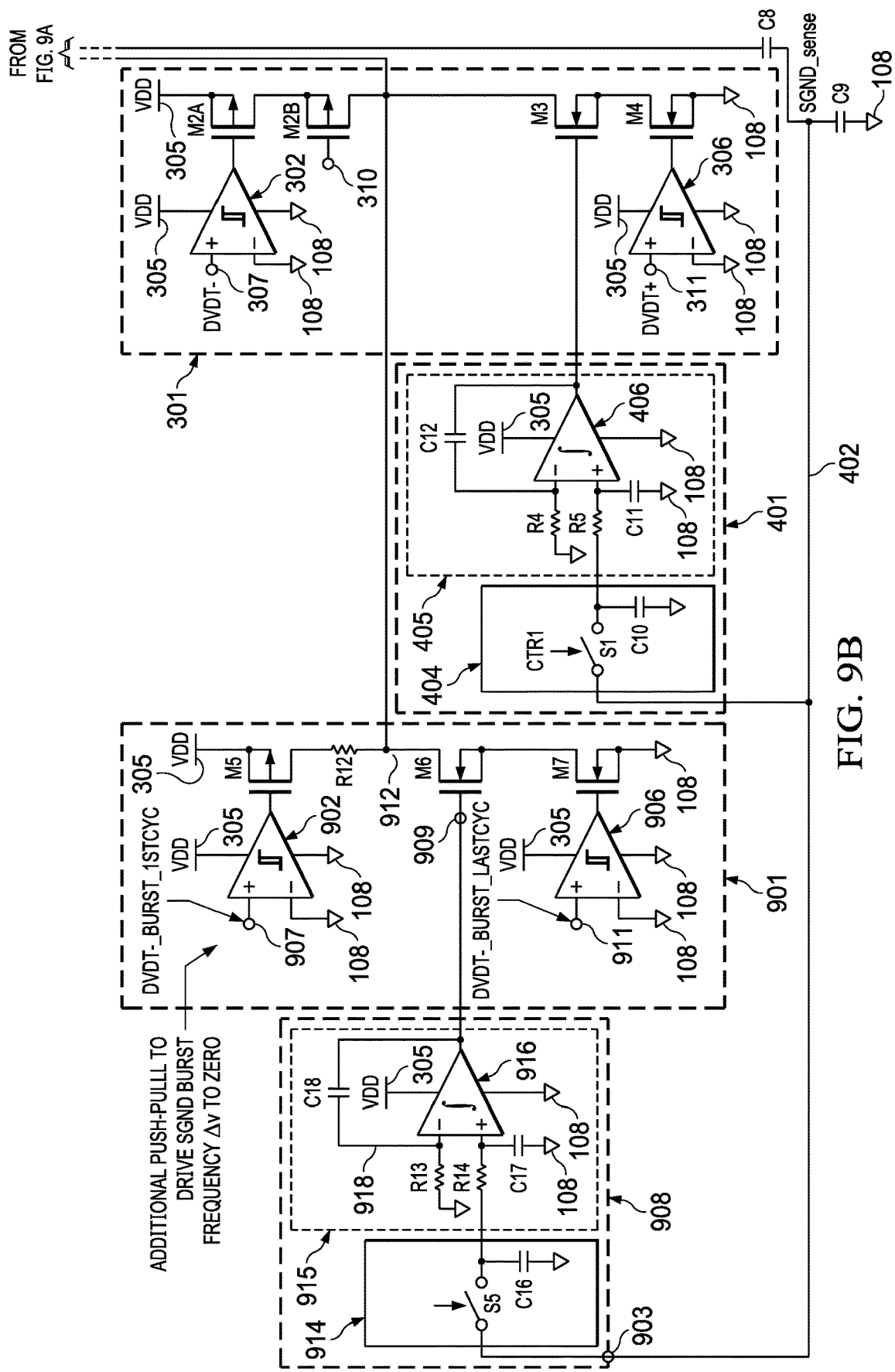

FIGS. 9A and 9B is a schematic diagram showing another switching converter 900 in accordance with various examples. In the example of FIG. 9, the switching converter 900 includes many of the same components described for the switching converters 100, 200, 300, and 400 of FIGS. 1-4. In addition, the switching converter 900 includes an additional push-pull current source 901 coupled to the bottom plate of C7. In the example of FIGS. 9A and 9B, the push-pull current source 901 includes three transistors, M5-M7. As shown, the first current terminal of M5 is coupled to the VDD node 305, the second current terminal of the M5 is coupled to a first end of a resistor (R12), and the control terminal of M5 is coupled to a driver circuit 902. With R12, the amount of current flow during a push operation is set to a maximum level. In other examples, R12 is replaced by a transistor (see e.g., M2B in FIG. 3A), which can be used to adjust the current flow during a push operation from a minimum level up to the maximum level.

In the example of FIGS. 9A and 9B, the driver circuit 902 is powered by VDD provided by the node 305. In operation, the driver circuit 902 selectively provides a drive signal to M5 based on VDD in response to a control signal (DVDT-_BURST_1STCYC) input to node 707. In the example of FIGS. 9A and 9B, DVDT-_BURST_1STCYC is a digital signal that goes high during the first switching transition of the drain voltage of M1 (at the beginning of the PWM ON mode of the switching converter 900). This switching transition is caused by M1 turning on for the first time in the PWM ON mode.

Also, the first current terminal of M6 is coupled to the second end of R12, the second current terminal of M6 is coupled to the first current terminal of M7, and the control terminal of M6 is coupled to a control node 909. As shown, the node 912 between R12 and the first current terminal of M6 is coupled to the bottom plate of C7. Also, the second current terminal of M7 is coupled to the primary ground node 108, and the control terminal of M7 is coupled to a driver circuit 906. In the example of FIG. 9, the driver circuit 906 is powered by VDD provided by the node 305. In operation, the driver circuit 906 selectively provides a drive signal to M7 based on VDD in response to a control signal (DVDT-_BURST_LASTCYC) input to node 307. In the example of FIGS. 9A and 9B, DVDT-_BURST_LASTCYC is a digital signal that goes high during the last switching transition of the drain voltage of M1 (at the end of the PWM ON mode of the switching converter 900). This switching transition is caused by M1 turning off for the last time in the PWM ON mode.

In addition, the switching converter 900 includes a controller 908 for the push-pull current source 901 coupled to the bottom plate of C7. As shown, the controller 908 includes an S&H circuit 914 coupled to an integrator circuit 915. More specifically, the S&H circuit 914 includes a switch (S5) and a capacitor (C16), where S5 is coupled between an input node 903 of the controller 908 and the top plate of C16. Meanwhile, the bottom plate of C16 is coupled to the primary ground node 108. In the example of FIGS. 9A and 9B, the input node 903 of the controller 908 is coupled to a sense arrangement that includes C8 and C9. With C8 and C9, a sense signal 402 related to the burst-frequency voltage changes at the node 115 is provided to the S&H circuit 914. In some examples, C7 is a first Y-rated capacitor and C8 is a second Y-rated capacitor of the switching converter 900.

The output of the S&H circuit 915 is provided to the integrator circuit 915. As shown, the integrator circuit 915 includes a resistor (R14) and a capacitor (C17) at the positive input (+) node of an operational amplifier 916. More specifically, R14 is between the output of the S&H circuit 914 and the + node of the operational amplifier 916. Also, C17 is between the + node of the operational amplifier 916 and the primary ground node 108. The integrator circuit 915 also includes a resistor (R13) at the negative input (−) node of the operational amplifier 916. In the example of FIGS. 9A and 9B, the integrator circuit 915 also includes a feedback loop 918 with a capacitor (C18) between the output of the operational amplifier 916 and the − node of the operational amplifier 916. The output of the integrator circuit 915 is coupled to the control node 909 at the control terminal for M6.

During switching operations of M1, voltage changes at the first winding of T2 result in voltage changes at the node 115. Due to C5 and C6, the switching operations of M1 and the related voltage changes are a contributor to EMI measured across the LISN resistors, R1 and R2. With C7-C9, the push-pull current source 301, and the controller 401, the voltage changes at the node 115 are reduced during PWM operations. With C7-C9, the push-pull current source 901, and the controller 908, the burst-frequency voltage changes at the node 115 are reduced during burst-mode operations. In one example, the voltage changes at the node 115 are the result of the controller 908 directing the push-pull current source 901 to pull current from the bottom plate of C7 when burst-frequency voltage changes are present at the node 115 as indicated by the sense signal 402. In some examples, the operations of the controller 908 and the push-pull current source 901 cause the secondary ground burst-frequency voltage change to go to zero.

With the switching converters 400, 600, 800, and 900 (see FIGS. 4, 6A, 8A-1, 8A-2, 9A, 9B), a switching converter circuit with a first Y-rated capacitor node (e.g., at the bottom plate of C7) is represented along with a push-pull current source (e.g., the push-pull current source 301 in FIGS. 4, 6A, 8A-2, 9B) coupled to the first Y-rated capacitor node. The switching converter circuit also includes a controller (e.g., the controller 410 in FIGS. 4, 6A, 8A-2, 9B) coupled to the push-pull current source. In some examples, the controller comprises a sample-and-hold circuit (e.g., the sample-and-hold circuit 404) coupled to a second Y-rated capacitor node (at the bottom plate of C8). The controller also comprises an integrator circuit (e.g., the integrator circuit 405) coupled to the sample-and-hold circuit.

In some examples, the sample-and-hold circuit is a first sample-and-hold circuit, the integrator circuit is a first integrator circuit, and the switching converter circuit further comprises a DCM circuit (e.g., the DCM circuit 701 in FIG. 8A-2) coupled to the second P-rated capacitor node. The DCM circuit includes a second sample-and-hold circuit (e.g., the sample-and-hold circuit 714 in FIG. 8A-2) and a second integrator circuit (e.g., the integrator circuit 715 in FIG. 8A-2) coupled to the sample-and-hold circuit. The DCM circuit also includes an amplifier (e.g., the amplifier 720 in FIG. 8A-2) coupled to the second integrator circuit, wherein the amplifier is coupled to the first Y-rated capacitor node via a switch (e.g., S4 in FIG. 8A-2). In some examples, the switch is a first switch, and the switching converter circuit includes a second switch (e.g., S3 in FIG. 8A-2) between the push-pull current source and the first Y-rated capacitor node. The second switch is closed and the first switch is open during a PWM ON mode of the switching converter. Also, the second switch is open and the first switch is closed during a PWM OFF mode of the switching converter.

In some examples, the push-pull current source is a first push-pull current source, and the switching converter circuit also includes a second push-pull current source (e.g., the push-pull current source 908 in FIG. 9B) coupled to the second Y-rated capacitor node. The first push-pull current source is configured to operate during a PWM ON mode of the switching converter circuit, and the second push-pull current source is configured to operate during first and last switching cycles of a burst mode of the switching converter.

In some examples, an integrated circuit comprises a first Y-rated capacitor node (e.g., at the bottom plate of C7) and a second Y-rated capacitor node (at the bottom of C8). The integrated circuit also includes a push-pull current source (e.g., the push-pull current source 301 in FIGS. 4, 6A, 8A-2, 9B) coupled to the first Y-rated capacitor node. The integrated circuit also includes a controller (e.g., the controller 410 in FIGS. 4, 6A, 8A-2, 9B) coupled to the push-pull current source, where the controller is configured to monitor voltage changes at the second Y-rated capacitor node, and to selectively push current to or pull current from the first Y-rated capacitor node. In some examples, the controller comprises a sample-and-hold circuit (e.g., the sample-and-hold circuit 404 in FIG. 4) coupled to the second Y-rated capacitor node. The controller also comprises an integrator circuit (e.g., the integrator circuit 405) coupled to the sample-and-hold circuit.

Also, the push-pull current source of the integrated circuit includes a push transistor (e.g., M2A in FIGS. 4, 6A, 8A-2) having a first current terminal coupled to an input voltage supply (VDD), a second current terminal coupled to the first Y-rated capacitor node via a resistor (e.g., R12 in FIG. 9B) or a push adjustment transistor (e.g., M2B in FIGS. 4, 6A, 8A-2), and a control terminal coupled to a first driver circuit (e.g., the driver circuit 302 in FIGS. 3A, 3B, 4, 6A, 8A-2, and 9B). The push-pull current source also includes a pull transistor (e.g., M4 in FIGS. 3A, 3B, 4, 6A, 8A-2, and 9B) having a first current terminal, a second current terminal, and a control terminal, wherein the second current terminal of the pull transistor is coupled to a ground node. The push-pull current source also includes a control transistor (e.g., M3 in FIGS. 3A, 3B, 4, 6A, 8A-2, and 9B) having a first current terminal, a second current terminal, and a control terminal. The first current terminal of the control transistor is coupled to one end of the resistor (e.g., R12 in FIG. 9B) or to a second current terminal of the push adjustment transistor (e.g., M2B in FIGS. 4, 6A, 8A-2). The second current terminal of the control transistor is coupled to the first current terminal of the pull transistor. Also, the control terminal of the control transistor is coupled to the sense controller.

In some examples, the sample-and-hold circuit (e.g., the sample-and-hold circuit 404 in FIG. 4) is a first sample-and-hold circuit, and the integrator circuit (e.g., the integrator circuit 405) is a first integrator circuit. In such examples, the integrated circuit also includes DCM circuit (e.g., the DCM circuit 701 in FIG. 8A-2) coupled to the second Y-rated capacitor node. The DCM circuit includes a second sample-and-hold circuit (e.g., the sample-and-hold circuit 714 in FIG. 8A-2) and a second integrator circuit (e.g., the integrator circuit 715 in FIG. 8A-2) coupled to the second sample-and-hold circuit. The DCM circuit also includes an amplifier (e.g., the amplifier 720 in FIG. 8A-2) coupled to the second integrator circuit, wherein the amplifier is coupled to the first Y-rated capacitor node via a switch (e.g., S4 in FIG. 8A-2). In some examples, the switch is a first switch, and the integrated circuit also includes a second switch (e.g., S3 in FIG. 8A-2) between the push-pull current source and the first Y-rated capacitor node. The second switch is closed and the first switch is open during a PWM ON mode of a switching converter. During a PWM OFF mode of the switching converter, wherein the second switch is open and the first switch is closed.

Also, in some examples, the push-pull current source (e.g., the push-pull current source 301 in FIGS. 4, 6A, 8A-2, 9B) is a first push-pull current source, and the integrated circuit also includes a second push-pull current source (e.g., the push-pull current source 908 in FIG. 9B) coupled to the second Y-rated capacitor node, wherein the first push-pull current source is configured to operate during a PWM ON mode of a switching converter. Also, the second push-pull current source is configured to operate during a PWM OFF mode of the switching converter.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A system, comprising:
   a voltage supply input;
   a switching converter coupled to the voltage supply input, the switching converter including:
      a transformer having a primary coil coupled to the voltage supply input and a secondary coil having a first end and a second end;
      a first Y-rated capacitor with a top plate and a bottom plate, the top plate being coupled to the first end of the secondary coil;
      a second Y-rated capacitor with a top plate and a bottom plate, the top plate of the second Y-rated capacitor being coupled to the first end of the secondary coil to sense a voltage change;
      a push-pull current source coupled to the bottom plate of the P-rated capacitor;
      a controller coupled to the push-pull current source, the controller including a sample-and-hold circuit coupled to the bottom plate of the second Y-rated capacitor.

2. The system of claim 1 in which the controller includes an integrator circuit coupled to the sample-and-hold circuit.

3. The system of claim 1 including a discontinuous conduction mode (DCM) circuit coupled to the bottom plate of the second Y-rated capacitor, in which the DCM circuit includes:
   an integrator circuit coupled to the sample-and-hold circuit; and
   an amplifier coupled to the integrator circuit, in which the amplifier is coupled to the bottom plate of the first Y-rated capacitor via a switch.

4. The system of claim 3, in which the switch includes a first switch, in which the system includes a second switch between the push-pull current source and the bottom plate of the first Y-rated capacitor, the second switch is closed and the first switch is open during a pulse-width modulation (PWM) ON mode of the switching converter, and the second switch is open and the first switch is closed PWM OFF mode of the switching converter.

5. The system of claim 1 in which the push-pull current source is a first push-pull current source, and the system includes a second push-pull current source coupled to the bottom plate of the second Y-rated capacitor, the first push-pull current source is configured to operate during a pulse-width modulation (PWM) ON mode of the switching converter, and the second push-pull current source is configured to operate during first and last switching cycles of a burst mode of the switching converter.

6. The system of claim 1 including a discontinuous conduction mode (DCM) clamp coupled to the transformer.

7. A switching converter circuit, comprising:
   a first Y-rated capacitor node;
   a second Y-rated capacitor node;
   a push-pull current source coupled to the first Y-rated capacitor node;
   a controller coupled to the push-pull current source, the controller includes:
      a sample-and-hold circuit coupled to the second P-rated capacitor node; and
      an integrator circuit coupled to the sample-and-hold circuit.

8. The switching converter circuit of claim 7, in which the sample-and-hold circuit is a first sample-and-hold circuit, the integrator circuit is a first integrator circuit, and the switching converter circuit includes a discontinuous conduction mode (DCM) circuit coupled to the second P-rated capacitor node, the DCM circuit includes:
   a second sample-and-hold circuit;
   a second integrator circuit coupled to the sample-and-hold circuit; and
   an amplifier coupled to the second integrator circuit, wherein the amplifier is coupled to the first Y-rated capacitor node via a switch.

9. The switching converter circuit of claim 8, in which the switch includes a first switch, the switching converter circuit includes a second switch between the push-pull current source and the first Y-rated capacitor node, in which the second switch is closed and the first switch is open during a pulse-width modulation (PWM) ON mode of a switching converter, and the second switch is open and the first switch is closed during a PWM OFF mode of the switching converter.

10. The switching converter circuit of claim 7, in which the push-pull current source is a first push-pull current source, the switching converter circuit including a second push-pull current source coupled to the second Y-rated capacitor node, the first push-pull current source being configured to operate during a pulse-width modulation (PWM) ON mode of a switching converter, and the second push-pull current source is configured to operate during first and last switching cycles of a burst mode of the switching converter.

11. The switching converter circuit of claim 7, including:
   a transformer with a primary coil and a secondary coil, a first end of the secondary coil being coupled to the first Y-rated capacitor node; and
   a discontinuous conduction mode (DCM) clamp coupled to the transformer.

12. The switching converter circuit of claim 7, in which the first Y-rated capacitor node, the second Y-rated capacitor node, the push-pull current source, and the controller are components of an integrated circuit.

13. The switching converter circuit of claim 12, including:
   a transformer with a primary coil and a secondary coil, a first end of the secondary coil is coupled to the first Y-rated capacitor node;
   a first Y-rated capacitor with a top plate coupled to the first end of the secondary coil and with a bottom plate coupled to the first Y-rated capacitor node; and
   a second Y-rated capacitor with a top plate coupled to the first end of the secondary coil and with a bottom plate coupled to the controller.

14. An integrated circuit, comprising:
   a first Y-rated capacitor node;
   a second Y-rated capacitor node;
   a push-pull current source coupled to the first Y-rated capacitor node;
   a controller coupled to the push-pull current source, wherein the controller is configured to monitor voltage changes at the second P-rated capacitor node, and to selectively push current to or pull current from the first Y-rated capacitor node, the controller including:
      a sample-and-hold circuit coupled to the second Y-rated capacitor node; and
      an integrator circuit coupled to the sample-and-hold circuit.

15. The integrated circuit of claim 12 in which the push-pull current source includes:
- a push transistor having a first current terminal coupled to an input voltage supply, a second current terminal coupled to the first Y-rated capacitor node via a resistor, and a control terminal coupled to a first driver circuit;
- a pull transistor having a first current terminal, a second current terminal, and a control terminal, the second current terminal of the pull transistor is coupled to a ground node; and
- a control transistor having a first current terminal, a second current terminal, and a control terminal, the first current terminal of the control transistor is coupled to one end of the resistor, the second current terminal of the control transistor is coupled to the first current terminal of the pull transistor, and the control terminal of the control transistor is coupled to the controller.

16. The integrated circuit of claim 14 in which the sample-and-hold circuit is a first sample-and-hold circuit, the integrator circuit is a first integrator circuit, and the integrated circuit includes a discontinuous conduction mode (DCM) circuit coupled to the second Y-rated capacitor node, the DCM circuit includes:
- a second sample-and-hold circuit;
- a second integrator circuit coupled to the second sample-and-hold circuit; and
- an amplifier coupled to the second integrator circuit, the amplifier is coupled to the first Y-rated capacitor node via a switch.

17. The integrated circuit of claim 16, in which the switch includes a first switch, the integrated circuit includes a second switch between the push-pull current source and the first Y-rated capacitor node, the second switch is closed and the first switch is open during a pulse-width modulation (PWM) ON mode of a switching converter, and the second switch is open and the first switch is closed during a PWM OFF mode of the switching converter.

18. The integrated circuit of claim 14, in which the push-pull current source is a first push-pull current source, the integrated circuit includes a second push-pull current source coupled to the second Y-rated capacitor node, the first push-pull current source is configured to operate during a pulse-width modulation (PWM) ON mode of a switching converter, and the second push-pull current source is configured to operate during a PWM OFF mode of the switching converter.

* * * * *